(12) United States Patent
Lynch et al.

(10) Patent No.: US 7,485,171 B2
(45) Date of Patent: Feb. 3, 2009

(54) USE OF SOLID-PHASE BUFFER TO IMPROVE PLANT CULTIVATION

(75) Inventors: Jonathan Lynch, State Collete, PA (US); Eric Lyons, Burlington, IA (US); Robert H. Snyder, Howard, PA (US)

(73) Assignee: The Penn State Research Foundation, University Park, PA (US)

( * ) Notice: Subject to any disclaimer, the term of this patent is extended or adjusted under 35 U.S.C. 154(b) by 906 days.

(21) Appl. No.: 10/903,210

(22) Filed: Jul. 30, 2004

(65) Prior Publication Data

US 2005/0061045 A1  Mar. 24, 2005

Related U.S. Application Data

(60) Provisional application No. 60/491,498, filed on Jul. 31, 2003.

(51) Int. Cl.
*C05B 17/00* (2006.01)

(52) U.S. Cl. .......................................... 71/32
(58) Field of Classification Search ............... 71/32–48
See application file for complete search history.

(56) References Cited

U.S. PATENT DOCUMENTS

| | | | | |
|---|---|---|---|---|
| 3,082,076 | A * | 3/1963 | Hemwall | 71/27 |
| 3,206,298 | A * | 9/1965 | Smalter | 71/49 |
| 4,832,735 | A * | 5/1989 | Crouse et al. | 71/36 |
| 5,693,119 | A | 12/1997 | Lynch et al. | |
| 6,287,357 | B1 | 9/2001 | Lynch et al. | |
| 2003/0061850 | A1 * | 4/2003 | Young | 71/34 |
| 2005/0061045 | A1 | 3/2005 | Lynch et al. | |

* cited by examiner

*Primary Examiner*—Wayne Langel
(74) *Attorney, Agent, or Firm*—The Webb Law Firm

(57) ABSTRACT

The present invention provides a phosphorus solid-phase buffering system that can be spatially localized, i.e., banded on top of, or at specific depths, in media, e.g., soil, by which phosphorus concentrations in the media are reduced or maintained at levels sufficient for optimal plant performance. Also provided are methods for improving the cultivation of plants growing in different media. The present invention provides benefits, such as reduced water and pesticide requirements, reduced phosphorus leaching and runoff, and enhanced root growth. The invention can be used in connection with containerized or field-grown plants, e.g., crops, grasses, trees, and the like. The invention is particularly useful for greenhouse and nursery plants, ornamental propagation, vegetable and bedding transplants, and for turf used for stadium fields, golf courses, lawns and the like, where phosphorus leaching is particularly undesirable.

48 Claims, 18 Drawing Sheets

A. Poa annua

No

Al-P

Complete
Hoaglands

Phosphorus leaching from a simulated golf green

Taken from: Shuman, 1998, USGA green section annual report

Table 1. Approximate Depths of Primary Rooting of Various Crops

| Shallow (<6 inches) | Intermediate (6-12 inches) | Deep (>12 inches) |
|---|---|---|
| Turfgrass | Many vegetables | Trees |
| Greenhouse crops | Small conifers | Woody ornamentals |
| Ferns | Tree seedlings | Field crops |
| Ericaceous plants | Brambles | Orchards |
| Orchids | Perennial bulbs | Grapes |
| Vegetable transplants | Annual flowers | Some vegetables |
| Bedding plants | Strawberries | Sugar cane |
| Nursery ornamentals | | Plantation crops |

Fig. 18

USE OF SOLID-PHASE BUFFER TO IMPROVE PLANT CULTIVATION

CROSS-REFERENCE TO RELATED APPLICATIONS

This application claims priority to U.S. Provisional Application No. 60/491,498, filed Jul. 31, 2003, which is incorporated herein by reference.

BACKGROUND OF THE INVENTION

1. Field of the Invention

The present invention relates to a system and a method for the fertilization of plants, including ornamental and horticultural plants, crops, grasses, transplants and turf systems. In particular, the invention relates to the use of a spatially localized, banded phosphorus solid-phase buffered system for the reduction of phosphorus in high-phosphorus media and regulation of phosphorus levels in media generally.

2. Description of Related Art

Plants coordinate and regulate their growth in response to environmental signals, including light, water and nutrients. Phosphorus (P) is one of the essential mineral macronutrients that is directly involved in plant metabolism and cannot be replaced by other elements. In the absence of P, a plant will not be able to complete its life cycle. Furthermore, P is a nutrient that is required in higher amounts for optimal plant growth, including root growth, root branching, shoot growth and branching, leaf and stem expansion, and reproductive development. Precise control of P availability, as is made possible by aluminum buffering, permits the manipulation of plant growth in horticulture and agriculture. For example, it is desirable to control the size and shape of the shoot system in the production and cultivation of many plants, including turf, transplants, and flowering ornamentals. In such cases excessive shoot growth reduces product quality or appearance, or increases maintenance requirements.

The use of low levels of P, for example, less than 100 micromolar phosphate, permits the cultivation of plants at a rapid rate of overall biomass accumulation without excessive shoot growth. Growers often desire a well-developed, highly branched root system, especially in the production of plants that will be transplanted into soil after production, including bedding plants, nursery ornamentals, woody plant and tree seedlings, and commercial vegetable transplants. Furthermore, the use of low levels of P also promotes root branching.

The main driving force for moving P to the root surface is diffusion. Diffusion occurs when ions move from a region of higher concentration to lower concentration. Diffusion through a short distance is much faster than through a long distance because the time required for a substance to diffuse a given distance is determined by the square of the distance. This suggests that the uptake of a certain nutrient by diffusion is strongly related to available ions close to the root surface. P is usually stabilized in soils and tends to be less mobile compared to other nutrients.

Aluminum (Al) is not an essential element for plant growth. Most plants are sensitive to high Al concentrations. Al interferes with the uptake of P directly through the precipitation of aluminum phosphate, because P is bound by strong P adsorption to clay minerals. Since Al is immobile in plant tissue, it is seldom transported to shoots and the accumulation is mostly confined to the roots.

A solid-phase fertilizer/buffer made from aluminum oxide pellets (alumina, $Al_2O_3$) and P, collectively, Al—P, was originally developed for a P nutrition study in a container system using sand as the growing medium. The purpose of using Al—P was to simulate a realistic supply in the controlled environment. Coltman et al. (Am. Soc. Hort. Sci., 107:938-942, 1982) first developed the sand-alumina culture system with P supplied from the P-absorbed alumina, which was obtained from activated alumina loaded with phosphate ($KH_2PO_4$). This sand-alumina culture technique not only showed promise for simulating plant responses to P concentrations under conditions comparable to those found in soils, but also provided a range of stable and reproducible P concentrations for a more ideal experimental medium. It has been found that the P concentration desorbed from sand-alumina is dependent on the P concentration loaded on the alumina, and that after the stability of solution P concentration in the culture has been reached, increasing the density of P-loaded alumina in the sand has no effect on the average culture P concentration. Thus, diffusion, the rate-limiting step in the uptake of P from soil, appears to be rate-limiting in a sand-alumina system as well. Additionally, the extent of the diffusion-limitation can be manipulated by changing alumina density (Coltman et al., 1982).

U.S. Pat. No. 5,693,119 to Lynch et al. (incorporated herein by reference) discloses the use of P fixed to Al (Al—P) in soil-less-growing media, such as peat, vermiculite, perlite, and mixtures thereof. The '119 patent discloses that the soil-less container system with Al—P displays greatly reduced P leaching from the container and plants display growth that is equivalent or superior to that of plants grown with conventional fertilizers. However, the '119 patent does not disclose the application of an Al—P system to anything other than a low-soil or soil-less container system.

U.S. Pat. No. 6,287,357 to Lynch et al. (incorporated herein by reference) describes the use of Al—P as a fertilizer and P buffer in soils, which is especially useful for plants grown in low P soils. The Al—P is applied to soils, wherein the P bound to the alumina is desorbed and released into the soil in a sustained fashion, thereby supplying a consistent supply of P to the plants. Thus, the '357 patent is directed to applying P to soil. It is not directed, however, to soils already containing high or optimal levels of P or to systems that contain anything other than Al—P fertilizer.

More importantly, the above-mentioned patents do not disclose the concepts of spatially positioning, i.e., banding, a P supply to encourage root growth in a desired plant species, or of placing P at a location in the root zone where certain invasive species cannot access the nutrient, thereby selectively encouraging plant growth of desired species.

A number of problems are associated with traditional sustained and/or intensive P fertilization of soils. One problem is that P, through leaching or runoff, may find its way to rivers, streams, estuaries and other bodies of water, where it poses risks to humans and the environment. Because biological activity in many aquatic systems is limited by low P availability, this influx of P creates algal blooms and other biological responses that are generally detrimental. P pollution of water resources and natural ecosystems is one of the principal health and environmental concerns associated with agriculture in the United States and other industrialized nations. A number of solutions have been applied to this problem, such as reduction of fertilizer application, reduction of erosion and runoff from agricultural lands through contour terracing, riparian green strips and retention ponds, as well as the use of technologies, such as coated fertilizers that may release P more slowly into the soil. These methods, however, are expensive and require a high level of expertise or sophistication in monitoring the P content of the soil and the leachate.

Another problem associated with typical P fertilization methods used in agricultural, horticultural, residential and municipal settings is the periodic high soil P availability that results from the fertilization methods, which may have detrimental effects on plant growth by reducing root growth and by creating nutritional imbalances with other essential nutrients, such as calcium, zinc and iron. Currently available P fertilizers and methods for fertilizing soils do not adequately synchronize the P-supplying capacity of the soil with the P demand of growing plants. Many technologies have been employed to address this problem, and some are effective to a limited extent. However, such approaches typically require significant expense by the grower, expertise or sophistication in monitoring the nutritional requirements of a growing crop to avoid deficits, or they may not be well suited to soils of inherently low P retention capacity, such as sandy soils, organic soils, and soils that are already saturated with P from previous P applications. For example, the use of "slow release" P fertilizers, such as Osmocote, a resin-coated fertilizer, is not always optimal because these products release P as a function of water content of the soil, temperature of the soil, and time, which may not be directly associated with the timing of the nutritional requirements of the crop.

There is a need for an environmentally friendly means of limiting the growth of non-desired plant species. Current plant management techniques rely on herbicides, pesticides, plant growth regulators, etc., which often pollute soil and water and which may have carcinogenic and teratogenic effects on humans and other mammalian species. The elimination or reduction of such chemicals would reduce the burden on the environment and the financial cost borne by farmers, golf courses, municipalities and other landholders.

There also is a need for a means of improving the drought tolerance/resistance of plants, particularly in regions where water is a scarce resource, e.g., the sunbelt, or in areas undergoing desertification due to human disruption.

Thus, there exists a need to provide field crops, plants, and grasses with a suitable level of P that is responsive to the needs of the growing vegetation, while minimizing P leaching from media and minimizing contamination of the surface runoff with P. In particular, a need exists to provide a steady source of P to plant roots in any type of media, including turfgrass systems grown on constructed media. Presently, there is lacking a way to accomplish this in a cost-effective manner and in a manner that is equally applicable to the wide variety of media, crops and grasses in need of P regulation, while at the same time minimizing the potentially detrimental effects high P media levels can have on plant growth, human health and the environment.

SUMMARY OF THE INVENTION

The present invention addresses the aforementioned problems by providing a spatially configured, i.e., banded, phosphorus (P) supply, referred to herein as a "phosphorus solid-phase buffer," which encourages root growth in a desired plant species by placing the essential nutrient P at a location in the root zone where certain invasive species cannot access the supply. The spatially configured P system advantageously maintains and reduces P concentrations in media at levels sufficient for optimal plant performance, and minimizes P leaching and runoff. By placing, or banding, the spatially configured P system at specific depths in the media, it is possible to localize P availability at a particular depth. Localization of P availability permits the localization of root growth, because root growth in many plant species, such as the important turfgrass species *Agrostis stolonifera*, responds to P availability. Use of the spatially localized phosphorus solid-phase buffer permits the creation of deeper rooting than conventional fertilization methods. Deeper rooting has multiple benefits, including increased efficiency of soil and water use, reduced nitrate leaching, and increased plant tolerance to temperature and drought stress. Additionally, by holding the solution-phase phosphorus at a low level, phosphorus leaching through the soil is greatly reduced, and a steady supply of phosphorus to plant roots is assured, regardless of plant growth rate.

The spatial localization, or banding, of P has been known and practiced for some time with soluble fertilizers. To a lesser extent, it is also known that phosphorus placement can drive root growth. The present technology, however, differs from the prior art in that a solid-phase buffer is banded rather than banding P alone. This results in a much more permanent and stable P source. P availability can therefore be controlled much more precisely so that depletion does not occur. For instance, conventional fertilizers typically employ P levels of up to 2000 $\mu M$ and infrequently employ levels of up to 5000 $\mu M$. However, in the spatially localized phosphorus solid-phase buffered system of the present invention, the P concentration can be maintained at levels as low as 10, 50 or 100 $\mu M$, thus enhancing the growth of leaves, stems and roots, i.e., having a "growth regulatory effect," and decreasing expenses, including those related to materials and labor. Furthermore, in the event of P exhaustion, the present invention provides for recharging of the solid buffer, so that spatial localization of the P is maintained. The present invention therefore allows root growth and root distribution to be controlled in a manner that is not possible with conventional soluble phosphorus fertilizers. This feature is particularly important for turf and transplant systems. Additionally, the solid buffer serves as a protective barrier between the root zone and the environment, a benefit not provided by existing soluble fertilizers.

The present invention is based on the use of an aluminum oxide ($Al_2O_3$)-rich substrate which is exposed to a solution containing P for a time sufficient to adsorb the desired amount of P onto the surface of the substrate. This creates an exchange equilibrium with the aqueous solution in which the aluminum-rich substrate is placed. The aluminum may be supplied in various forms, including but not limited to, commercially available reactive $Al_2O_3$ pellets, aluminum hydroxide, clays, aluminum oxide rich soils, and even fairly crude bauxite, which has the advantage of being significantly cheaper than the processed reactive pellets. The aluminum buffered phosphorus is incorporated into the media according to the degree of P buffering required and is banded at a specific depth in the media, according to the rooting system of the target plant(s), i.e., the species in which growth is to be encouraged/inhibited. Because the appropriate banding level is dependent upon the type of rooting system possessed by the plant, namely, shallow, intermediate and deep, the banding depths will typically vary.

The solid-phase buffered material of the present invention can be used in connection with different types of media, including soil and soil-less planting media. More specifically, the solid-phase buffer can be applied to containerized or field-grown plants, e.g., crops, grasses, trees, and the like. The present invention is particularly useful for greenhouse and nursery plants, ornamental propagation, vegetable and bedding transplants, and for turf used for stadium fields, golf courses, lawns, etc., where P leaching is particularly undesirable. The present invention affords increased root growth in transplants, thus increasing transplant success rates.

In media with high P concentrations, the phosphorus solid-phase buffer (Al—P fertilizer/buffer) applied to the media adsorbs excess P in a sustained fashion, thereby normalizing the levels of P in the media and facilitating normal plant growth. In media where the concentration of P is optimal, solid-phase buffer applied to the media utilizes the chemical equilibrium between solid phase and solution phase P to spontaneously release more P into the media as needed. In media with low P concentrations, solid-phase buffer applied to the media builds up the P concentration in the media, e.g., when applied in conjunction with a suitable P fertilizer. Once an optimal concentration is reached, such concentration is maintained over time in accordance with the needs of the plant.

In particular, the present invention provides a plant growth medium, comprising between about 0.1 to 20% weight/volume, preferably between about 0.2 to 10% weight/volume, and most preferably between about 1 to 2% weight/volume of a solid-phase buffer that is distributed within a specific band of a rooting volume.

The present invention also provides a method of fertilizing field-grown plants, comprising applying the phosphorus solid-phase buffer to media in which the plants are grown, wherein the buffer is applied before, concurrently with, or after a fertilizer is applied to the media. The solid-phase buffer is incorporated into the media at a rate commensurate with the media type, plant needs and degree of P buffering required, e.g., from between about 0.1 to 20% weight/volume, preferably from between about 0.2 to 10% weight/volume, and most preferably from between about 1 to 2% weight/volume. When the particular media have a low P content, e.g., 0-30 ppm of P, fertilizer is applied to the media together with or after application of the solid buffer. This embodiment may further comprise applying a fertilizer to the media together with or after application of the solid buffer. Preferably, the fertilizer comprises a P-containing liquid, most preferably one containing a suitable amount of phosphoric acid.

The present invention further provides a method of reducing or preventing P leaching from a P-containing media. The method comprises applying the phosphorus solid-phase buffer to the P-containing media in an amount sufficient to reduce or prevent the P leaching from the media. The solid-phase buffer is incorporated into the media at a rate commensurate with the media type, requirements of crops that may be planted in the media, and degree of P buffering required, e.g., from between about 0.1 to 20% weight/volume, more specifically from between about 0.2 to 10% weight/volume, and most typically from between about 1 to 2% weight/volume.

The solid-phase buffer can be used in connection with unplanted media, or can be applied to constructed media in which plants are growing. The media may be a high P soil, comprising about 50 ppm or more of P prior to application of the banded phosphorus. Alternatively, the media may have a moderate P content, e.g., between about 30-50 ppm of P or be relatively depleted of P content, e.g., 0 to about 30 ppm, prior to application of the banded phosphorus.

The present invention also provides a method of spatially localizing, i.e., banding, the solid-phase buffer at a particular depth into an established rootzone, e.g., an existing golf course turf system, by methods that include, without limitation, drilling or hydroinjection, during aeration and compaction reduction operations, or by any other means that allows the system to be introduced at the particular depth. For instance, during standard aeration operations, several inches of the solid-phase buffer can be introduced into soil holes and then can be backfilled with unbuffered media. Over time, this gradually creates a band of P buffering at specific depths in the rootzone. The solid-phase buffer may alternatively be topdressed, i.e., applied directly onto the surface of the media. This form of application does not provide the benefits that result from deep rooting, but still provides reduced P leaching, runoff and P availability, with attendant benefits for enhanced plant quality, such as reduced shoot growth, darker green color, etc.

In still another aspect of the invention, a method is provided for incorporating the phosphorus solid-phase buffer at specific depths, or bands, during media construction, e.g., a turf system of an unfinished golf course. This creates a layer of available P at specific depths in the root zone. For example, about 1 to 2% weight/volume of the solid-phase buffer can be incorporated at a depth of about 20-30 cm in the rootzone mixture during the construction phase. This is of tremendous value with respect to golf courses, i.e., fairways, greens and tees, where plant quality is of singular importance.

The composition and methods of the present invention of the solid-phase buffer is particularly beneficial for use in stadia, athletic fields and parks. In these environments, it is often desirable to have vigorous shallow rooting, which enhances the resistance of the turf to the mechanical stresses of sports and decreases the incidence of injuries. In such cases topdressing, or topdressing combined with banding of the solid-phase buffer at specified depths, i.e., a dual zone system, promotes shallow root growth. Such a dual zone system affords several benefits that include vigorous shallow roots combined with enhanced water uptake and drought tolerance from enhanced deeper rooting.

Finally, the solid-phase buffered material of the present invention may be incorporated throughout the entire volume of media as opposed to being localized within a particular zone.

Other features and advantages of the present invention will be understood by reference to the detailed description and examples that follow.

BRIEF DESCRIPTION OF THE DRAWINGS

FIG. 18 Table 1 provides the approximate depths of primary rooting of various crops.

DETAILED DESCRIPTION OF THE INVENTION

Figure 1:
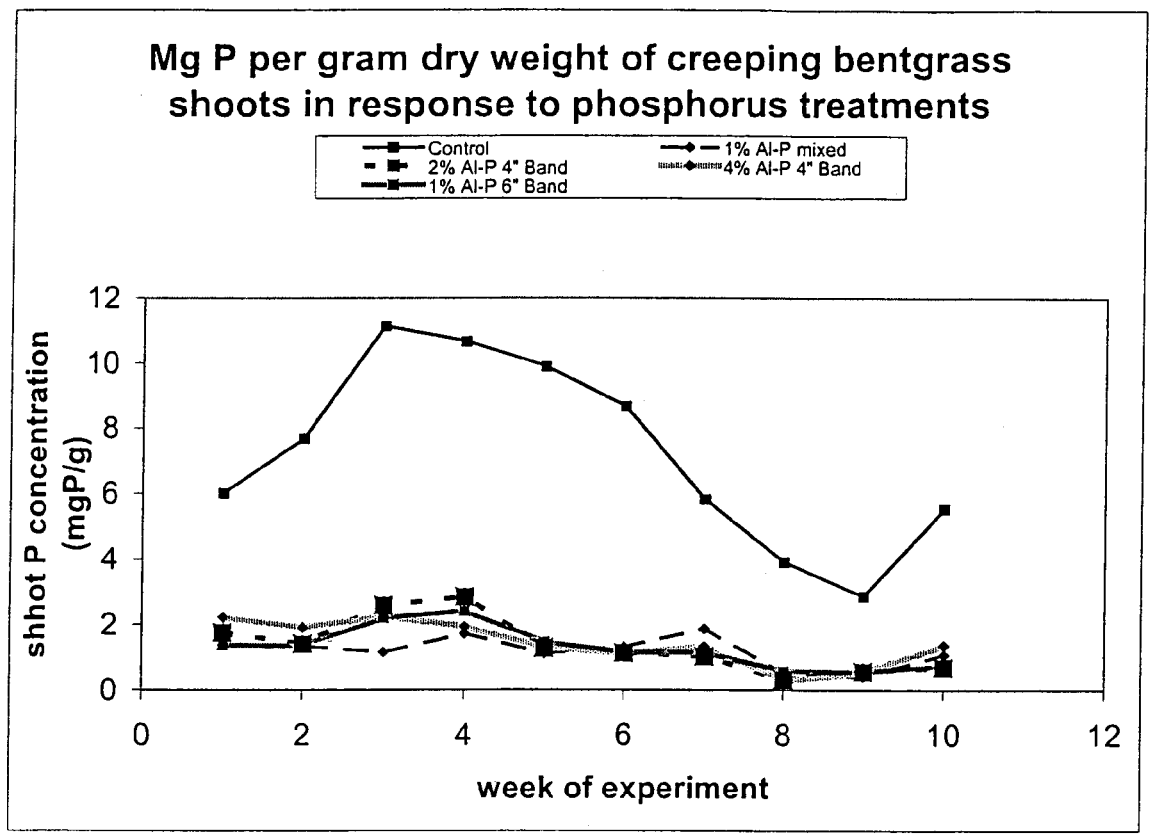
FIG. 1 is a graph of the phosphorus content of shoots of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.

The present invention is directed to a novel advance in the art of phosphate fertilization and phosphorus management in agriculture, namely, to a system and process for normalizing phosphorus (P) availability in media of all types, comprising treatment of P-fertilized media with a spatially localized, or banded, solid-phase buffered phosphorus supply.

As used herein, the term "media" is to be broadly construed, and can include, without limitation, naturally occurring earthen soils, as well as earthen soils containing additives, "artificial" substrates including, but not limited to, peat, perlite, vermiculite, rockwool, coconut fiber, sand and all combinations or mixtures thereof. The term "media" can also include earthen-growing media with non-soil elements.

As used herein, the terms "bands" or "banding" refer to a specific spatial localization of the solid-phase buffer in the media, which generally is described as the depth of the media in which the solid-phase buffer is localized.

The present invention is practiced by supplying a phosphorus solid-phase buffer to media. The solid-phase buffer utilized in the present invention comprises a metal-rich substrate material, such as aluminum, that is exposed to a solution containing phosphate for a time sufficient to adsorb the desired amount of phosphate onto the surface of the substrate. The exposure of the aluminum-rich material to the phosphate solution can occur either prior to or after installation of the material to the media. The aluminum can be supplied in various forms, including, but not limited to, the following: commercially available aluminum oxide ($Al_2O_3$) pellets, such as COMPALUX® from Alusuisse-Lonza Gruppe and DD-2 from Alcoa; bauxite; aluminum-rich soils such as oxisols; iron-rich soils; aluminum hydroxide; reactive clays, which are composed of aluminosilicate minerals; and aluminum-rich waste products from industry. Compounds having very similar chemistries to aluminum oxide, such as iron oxide, may be substituted for the aluminum buffer. However, such compounds are not readily available, are heavier than aluminum compounds, and are more expensive to ship.

With respect to providing good plant nutrition while buffering against P leaching, sandy soils, P-saturated soils and other soils with low phosphorus retention characteristics generally require more solid-phase buffer, while clay soils and other soils with higher phosphorus retention characteristics generally require less. The preferred amount of solid-phase buffer as a percentage of soil by volume/weight thus can range from between about 0.1% to 20%, more preferably from between about 0.2% to 10%, and most preferably from between about 1 to 2%.

The solid-phase buffer can be added to media before or after planting. In media with high P concentrations, due to previous heavy applications of P fertilizers and animal manures, e.g., greater than 50 ppm, or if the plant is growing slowly as a result of growth stage or environmental conditions, the solid-phase buffer takes up the excess P in a sustained fashion in order to normalize the levels of P in the media and facilitate normal plant growth. In addition to reducing P availability in media having high P concentrations, an exchange equilibrium between the solid phase and solution phase P provides optimal P nutrition over time without the need for grower monitoring or any additional P fertilization. If the concentration of media P is optimal, e.g., between about 30 and 50 ppm, the chemical equilibrium between the solid phase and solution phase P will spontaneously release more P into the media. In this way, the release of P from the buffered P fertilizer is proportional to the P requirement of a particular plant. In regions where the concentration of P is low, e.g., about 30 ppm or less, the solid-phase buffer will build up the P concentration in the media.

Once an optimal concentration is reached, such concentration is maintained over time in accordance with the needs of the plant. In the event that additional P is required, the solid-phase buffer can be recharged in situ through subsequent fertilizer application, e.g., using a P-containing liquid having a phosphoric acid concentration range compatible with a standard agricultural fertilization system. To recharge, the P-containing liquid remains in contact with the depleted material for a time sufficient to restore the desired P concentration to the phosphorus-desorbing aluminum so that the buffering capacity of the material is restored, usually in about 48 hours or so. Accordingly, the solid-phase buffer not only serves as a P source during the initial period of application, but thereafter also acts as a buffering agent for subsequent P fertilizer applications.

The solid-phase buffer is incorporated into the media according to the degree of P buffering required and can be banded at a specific depth in the media, according to the rooting system of the target plant(s), i.e., the species in which growth is to be encouraged/inhibited. Because the appropriate banding level is dependent upon the type of rooting system possessed by the plant, namely, shallow, intermediate and deep, the banding depths typically will vary. The selection of an appropriate localization depth for banding also is a function of the target plant system. For instance, in the case of containerized plants, e.g., transplants and nursery systems, the localization depth is largely dependent upon container size. As a general rule, however, the solid-phase buffer material typically is localized below the germinating seed or plant, oftentimes at the very bottom of the container, in order to encourage deep root growth. In turf systems, the solid-phase buffer frequently is applied within the first few inches of soil to encourage the development of a shallow rooting system, which enhances traction and results in fewer injuries. Alternatively, applying the solid-phase buffer at lower depths results in a dryer topsoil, inhibits the growth of moss and other invasive species, avoids the need for frequent reapplication of P fertilizers, and enables the roots to obtain water from underground sources, thereby improving the plant's resistance to drought. Approximate depths of primary rooting of various crops are shown in Table 1.

Application of the solid-phase buffer to media generally is accomplished by distributing a known quantity of the buffer onto the media surface, followed by incorporation or mixing of the buffer into the media, and localizing the material within the root zone/rooting volume of the desired species. The solid-phase buffer also can be incorporated at specific depths, or bands, into existing media, e.g. a turf system, by introducing the solid-phase buffer into soil holes and then backfilling the holes with unbuffered media, e.g., using a core cultivation technique. Alternatively, the solid-phase buffer may be top-dressed, i.e., applied to the surface of existing media in order to increase P availability.

Distribution of the solid-phase buffer generally comprises calculation of the volume of media to be treated using methods known by persons skilled in the art, measuring the volume of buffer into an agricultural apparatus for distributing dry fertilizers, such as a broadcast spreader, and delivering the buffer at a calculated rate at a specific depth in the media. The amount of solid-phase buffer required can be calculated by persons skilled in the art, and will vary depending upon the characteristics of the media and the needs of the species of plants.

Incorporation of the phosphorus solid-phase buffer into the media generally consists of plowing or tilling the media to the desired depth using methods known to those skilled in the art. The incorporation method evenly distributes a known quantity of the aluminum-buffered P throughout a spatially localized volume of media, preferably with the solid-phase buffer being most prevalent at the root depth of the germinating seeds or plants. Incorporation of solid-phase buffer also can be performed in planted crop fields using the same methods described herein to incorporate the solid-phase buffer into exposed media between growing plants, taking care not to damage the root structure of the crop. Application to exposed soil between growing plants serves to buffer against P leaching and runoff from exposed soils. Because aluminum is not highly migratory due to its low solubility, the phosphorus solid-phase buffer incorporated into field soil can remain in place for many years and can be recharged, unlike conventional fertilizers, which are absorbed by plants and permanently removed from the soil.

A known quantity of the phosphorus solid-phase buffer of the present invention can be spatially localized within the root zone of media that is under construction, such as a golf green. The typical golf green contains a sand based root zone (at least 60% sand) that is modified with organic matter such as peat or composted organic waste products. The root zone is typically 30 cm deep and rests on a 10 cm layer of pea gravel, which creates a perched water table between the two layers. This system provides adequate drainage and resists compaction while maintaining enough water for plant growth. By localizing the solid-phase buffer within the root zone, it is possible to favor the growth of deeper rooted turf species such as *A. stolonifera*, while discouraging the growth of shallow rooted, undesirable As mentioned above, a localized quantity of the solid-phase buffer can be applied to containerized or field-grown plants, e.g., crops, grasses, trees, and the like. The present invention thus is useful for greenhouse and nursery plants, ornamental propagation, vegetable and bedding transplants, and for turf used for stadium fields, golf courses, lawns and the like, where P leaching is particularly undesirable. The present invention is particularly beneficial for fungi-type root systems such as mushrooms, since these systems are exceptionally sensitive to P supply. Because the solid-phase buffer supplements native soils, enhances root growth and improves root distribution, it is especially suitable for use in transplant applications, such as forest regeneration and reestablishment of transplants in arid, desertified and reclaimed lands. These features advantageously increase transplant success rates and improve the overall quality, i.e., hardiness, drought tolerance etc., of the plant subsequent to transplantation.

The present invention is particularly suitable in turfgrass systems. The cultivation of turf systems in municipal, residential and recreational settings is a multi-billion dollar industry in the United States. Annual turfgrass seed sales are second only to corn in the United States and rank above soybeans and wheat combined. The industry consists of turf seed sales, turf fertilizers, turf pesticides and turf-associated equipment such as mowers and edgers. Although the grass family consists of approximately 600 genera and over 7,500 species, less than thirty species are utilized in turfgrass cultivation. Examples of such species include, without limitation, Kentucky bluegrass, fine fescue, perennial ryegrass, bentgrass, zoysiagrass, St. Augustinegrass, carpetgrass and bermudagrass. Certain species, such as crusted wheatgrass, buffalograss and blue gramagrass, are native to arid conditions and do not require irrigation.

Irrigation and maintenance requirements for turfgrass not only depend on the type of species, but on the specific use of the turfgrass. For instance, the cutting height for golf greens and bowling greens is approximately one tenth to one quarter of an inch, while fairways and tees are typically one half to one quarter of an inch. These physical limitations require substantial irrigation using costly techniques, such as syringing, in order to avoid desiccation and subsequent death of the turfgrass. Interestingly, the costs of the aforementioned maintenance and irrigation practices pale in comparison to the costs associated with reconstruction of a golf green (typically $1 M-$3.2 M per course).

Residential lawns typically have heights ranging from one to three inches and are therefore hardier and require less irrigation and maintenance. Turfgrass grown along the sides of roads, adjacent to parking lots, and along airport runways may have heights of three inches or higher.

Turfgrass quality can be broken down into its component parts: uniformity, density, texture, growth habit, and color. The use of the turfgrass determines the relative importance of these components. A description of each component part follows:

Uniformity: Uniformity refers to the ability of a turfgrass to provide consistent coverage without the invasion of weeds, disease or the presence of bare spots. It also can refer to uniformity of the other aspects of turf quality throughout the plot.

Density: Turfgrass density refers to the number of tillers that are found in a given area. It determines the ability of a turfgrass to provide adequate soil stabilization and traction.

Texture: Texture refers to the width of the leaf blades. Texture can vary with plant density and affects uniformity of the turf. Wide leaf blades are those that have a rough texture and therefore generally are of lower quality.

Growth habit: The quality of turfgrasses used for athletic fields can be affected by the positioning of the turfgrass leaves, referred to as the growth habit. The growth habit can either be upright or prostrate. Prostrate growth habit is the positioning of the leaves horizontally along the ground. While a prostrate growth habit allows for lower mowing heights, it also creates a grain that may affect ball roll and may lead to a decrease in wear resistance.

Color: Turfgrass color is greatly affected by the nutrient status of the plants; generally darker green varieties are more desirable.

A less visible component of turfgrass quality is vigorous rooting and the balance between root and shoot growth, as reflected in the ratio of root biomass to shoot biomass, or "Root to Shoot Ratio" (RSR). Turf systems with vigorous rooting are more resistant to physical wear and tear, more tolerant of drought and high temperature stress, more competitive with invasive weeds, and more tolerant of pathogens and insect pests that attack root systems. In contrast, vigorous shoot growth is undesirable in mature turf systems because regular mowing can be costly, along with the labor input required to maintain a desirable turf height. Shoot growth also increases the demand for irrigation water and fertilization. Therefore, turf with a high RSR, or high ratio of root biomass to shoot biomass, is desirable.

Golf greens in particular are highly cultured areas where few species can survive. As described above, the root zone of a newly constructed golf green typically includes a mixture of sand and organic matter, e.g., peat, vermiculite, finely ground bark or sawdust. The USGA requires that the mixture contain at least 60% sand, however the mixtures frequently comprise approximately 75-85% sand and 15-25% organic matter. The sand particle size distribution is concentrated in the regions of coarse to medium (0.25-0.5 mm). The root zone is approximately 30 cm deep and rests on a 10 cm layer of pea gravel, which creates a perched water table between the two layers. This system provides adequate drainage and resists compaction while maintaining enough water for plant growth. Golf greens are typically grown using high fertilization and irrigation. Because the turf is mowed at approximately 2-5 mm, the primary stresses in this system are temperature and physical disturbance. Disease pressure often is minimized by the application of pesticides.

Creeping bentgrass (*Agrostis stolonifera* L. var. *palustris* (Huds. Farw.) is a utilitarian and ornamental grass predominantly cultivated in temperate climates throughout the world. It is stoloniferous and has a prostrate growth habit allowing it to be maintained at low mowing heights. The ability of creeping bentgrass to tolerate low mowing heights, its uniformity and hardiness have made it the standard grass chosen for golf greens in temperate climates. In 1954, Penn State University released Penn Cross, which was a cross-pollination of three different varieties of bentgrass and has become the standard in the industry today. Recently, more intensive breeding programs that select high quality strains from old Penn Cross greens have produced cultivars that appear to have improved heat and drought tolerance. The morphology of the species has been manipulated, creating varieties that have increased shoot density, finer leaf blade width, and a more upright growth habit.

Annual Bluegrass (*Poa annua* L. f. *reptans* (Hausskn.) T. Koyama) is the dominant weed in creeping bentgrass swards maintained at low heights (<2 cm) and is found in temperate climates throughout the world. *P. annua* typically has an upright growth habit and is slightly stoloniferous. The shoot densities vary greatly but most are more dense than creeping bentgrass when maintained at similar heights. *P. annua* is a very aggressive self-pollinated species that is able to flower and set seed at heights of less than 4 mm. Suppression of its seed heads increases the presence of *P. annua* on the green.

The presence of *P. annua* in turfgrass reduces the value of turf systems, which is economically important in private sector turf systems such as golf courses, athletic fields, etc. *P. annua* is less hardy than more desirable species and requires larger amounts of inputs such as fungicides, insecticides, irrigation and labor, which increases maintenance costs and contributes to environmental pollution. It is generally well known that low levels of P in media inhibit the growth of *P. annua*, while low nitrogen levels promote greater plant root mass. The spatially localized P supply of the present invention advantageously fosters growth of a desired plant species by regulating the levels of P and nitrogen in the media as well as levels of other plant growth regulators.

The difficulty of excluding *P. annua* from some golf courses has resulted in those golf courses being almost entirely dominated by this species. Because of the increased water requirements of *P. annua*, these courses require regular syringing of water in order to prevent heat damage in the summer. In the unusual situation where it is desired that a golf course remain dominated by *P. annua*, shallow application and banding of the phosphorus solid-phase buffer provided by the present invention can enhance the competitiveness of this species. Therefore, appropriate application of the solid-phase buffer can be used to manipulate the species composition of a turfgrass system.

In order to maintain turfgrass quality, managers of high value turf systems, such as golf courses, often employ intensive irrigation and fertilization programs. This is associated with the following problems: (1) In the case of fertilization, excess nitrogen and P not used by the grass roots may leach into subterranean water resources and other bodies of water, endangering humans and the environment; (2) A problem associated with excessive P application in agriculture is that high soil P availability may have detrimental effects on crop growth by reducing root growth and creating nutritional imbalances with other essential nutrients; (3) Irrigation requires water which in many regions of the United States is a scarce resource, notably in the sunbelt; and (4) Most turfgrass diseases develop as a result of excessive irrigation, e.g., 16-20 hours of moist surface.

Other inputs to turfgrass systems are leachable and contribute to groundwater pollution, notably nitrates and pesticides. For example, a substantial portion of the wells in the United States exceed EPA limits for nitrate contamination. Excess nitrates in drinking water are associated with methemoglobinemia (blue baby syndrome) and is believed to contribute to stomach cancer.

Reduced quality of turfgrass systems resulting from suboptimal fertilization and root growth results in turf that is less hardy, less uniform and has less durability. Golf courses with poor turf suffer reduced memberships, reduced land values, and higher maintenance costs, including chemical, water and labor expenses. Infestations of *P. annua* in residences causes more effort and expense for homeowners and increased replacement costs as poor turf fails to tolerate summer conditions. Poor turf quality in athletic fields results in increased injuries. Thus, the solid-phase buffer of the present invention can be applied in a shallow band, e.g., within the first few inches of media, in order to promote shallow root growth on athletic fields. This shallow rooting system allows for greater traction which, in turn, results in fewer injuries. The shallow root growth also permits greater durability of the turf system, a benefit that is of particular interest to athletic facilities, which host multiple athletic events, often on the same day.

Use of the phosphorus solid-phase buffer of the present invention has several benefits for turfgrass systems, especially those systems grown on constructed media such as golf greens. By banding P at sufficient depth for the targeted turfgrass species or at the specific root zone for the desired species, it is possible to favor the growth of deeper rooted turf species, such as *A. stolonifera*, while discouraging the growth of shallow rooted, undesirable species that are found in turfgrass systems, such as *P. annua* and other leguminous weeds. Localization of P availability permits the localization of root growth because root growth in many plant species, including *A. stolonifera*, responds to P availability. Use of the solid-phase buffer of the present invention permits the creation of deeper rooting than conventional fertilization methods. Deeper rooting has multiple benefits that include increased efficiency of soil water use that results in reduced irrigation requirements, reduced nitrate leaching, and increased plant tolerance to temperature and drought stress. Use of the solid-phase buffer also provides the environmental benefit of reduced P leaching and runoff into the environment.

In addition to the environmental disadvantage to invasive species such as *P. annua* (shallow root system) and moss (non-root bearing), resulting from such species' inability to access the localized P supply at a desired species' root zone, use of the present invention alleviates the need for extensive applications of pesticides. This is particularly important with respect to golf course pesticide usage due to the significant nature of the costs involved and the fact that herbicides for moss are being restricted much more extensively for environmental reasons.

An additional benefit provided by the present invention is that the use of the spatially localized P supply results in reduced turfgrass shoot growth that results in less mowing and maintenance, enhanced turfgrass root growth, increased root to shoot ratios and more intense shoot coloration, all of which improve the quality of stadia, parks, golf courses and other areas with heavy mechanical stress and high public visibility. Use of the spatially localized P supply also inhibits the growth of plant species which are disfavored by spectators, including those watching a sporting event on television. For instance, *P. annua* casts a silvery reflection on television monitors, a characteristic deemed undesirable by spectators and turf managers alike.

Finally, the use of the solid-phase buffered P fertilizer of the present invention eliminates the risk of misapplication of fertilizer onto roadsides, walkways, and other nonturf areas that occurs with broadcast fertilizer, which results in runoff pollution.

The following examples are representative of the present invention and are not meant to limit the scope of the invention. The examples are drawn to specific uses of the solid-phase buffer for growing plants in various types of media and for buffering P content in such media, where P concentrations are high, or P runoff and leaching are a concern.

EXAMPLE 1

Effect of Aluminum Phosphate on Phosphorus Dynamics in Turf

1. Methodology

A. (1) Turfgrass was grown over time in a sand-culture system (pvc columns) that mimics the profile of a constructed golf course. The columns were constructed from 15-inch long sections of 4" diameter, schedule 40 PVC pipe. A square of landscape cloth was attached to the bottom of the column with duct tape to hold the sand and gravel in the column and to permit water drainage. A 3-inch layer of pea gravel was placed in the bottom of each column to facilitate drainage.

(2) Alumina-P fertilizer buffering at 30 uM P was mixed into the sand in two applications; a homogenous mix, and a 4" deep band starting 8" below the surface. Only P supplied to the alumina-amended plants came directly from the alumina-P mixed into the sand.

(3) Normal fertilization (NPK) was applied as a complete nutrient solution (E. Epstein, Principles of Plant Nutrition, Academic Press, 1972) at ¼ strength for macronutrients and full strength for micronutrients. Nutrient solutions were adjusted to pH 6.5 with 0.5 N HCl and NaOH.

B. (1) To determine the P uptake over time, grass shoots (tillers) were harvested each week, over a 10-week period of growth. The shoots were dried, weighed, ashed at 500° C. and analyzed for P content.

(2) The plants were not clipped back as in mowing, so that the uptake of P reflected the total biomass produced in undisturbed plants.

Treatment 1: Control-Plain Golf Course Sand with No Alumina-P Fertilizer Nutrient Solution=¼ strength Nutrient Solution to provide 4.4 mM Nitrogen, 1.5 mM Potassium, 0.5 mM Phosphorus; including 0.94 mM Calcium and 0.25 mM each Magnesium and Sulfur, plus full strength micronutrients.

Treatments 2 to 5

Minus P nutrient solution to provide 4.4 mM Nitrogen, and 1.5 mM Potassium; including 0.94 mM Calcium and 0.25 mM each Magnesium and Sulfur, plus micronutrients full strength.

Treatment 2: 1% Mix alumina-P

In this treatment, the amount of alumina-P needed was calculated as wt (g) of alumina/volume of the 11" deep column of sand (4" diameter).

Treatment 3: 1% Band alumina-P

This treatment included 1% wt of alumina-P per volume of a 4" deep, by 4" in diameter column of sand placed at the bottom of the column.

Treatment 4: 2% Band alumina-P

This treatment included 2% wt of alumina-P per volume of a 4" deep by 4" diameter column of sand placed at the bottom of the column.

Treatment 5: 4% Band of alumina-P

This treatment included 2% wt of alumina-P per volume of a 4" deep by 4" diameter column of sand placed at the bottom of the column.

Results

Figure 2:
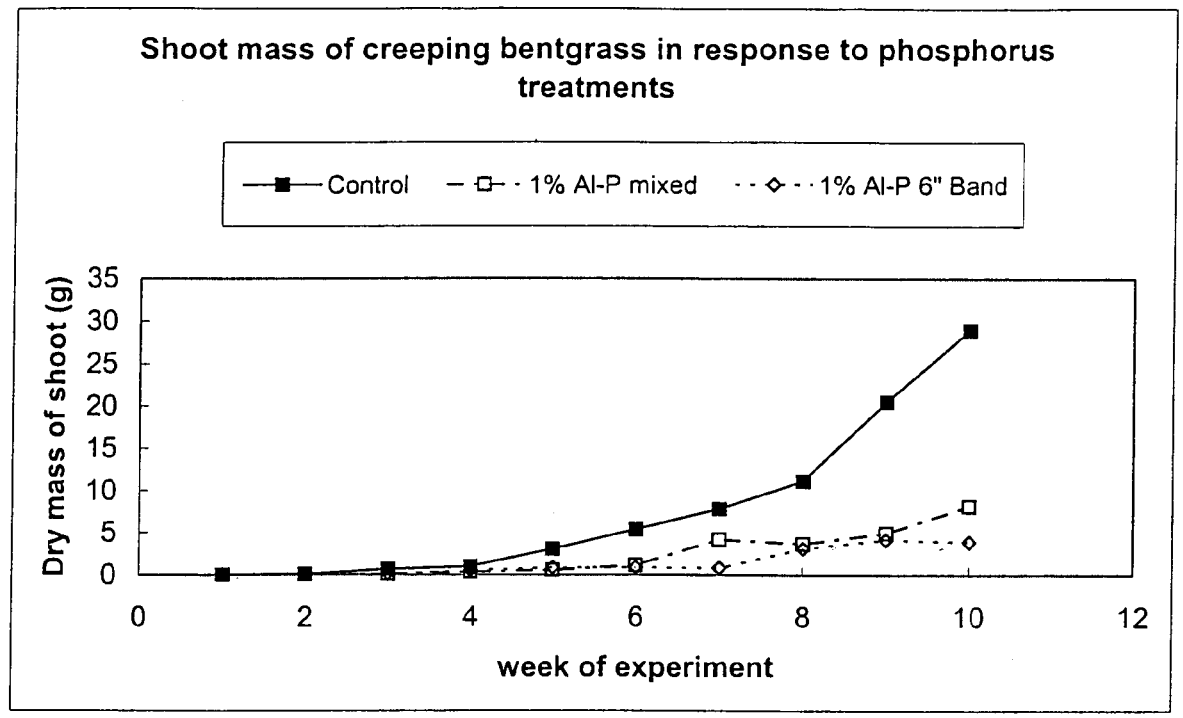
FIG. 2 is a graph of the mass of the shoots of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.
Figure 3:
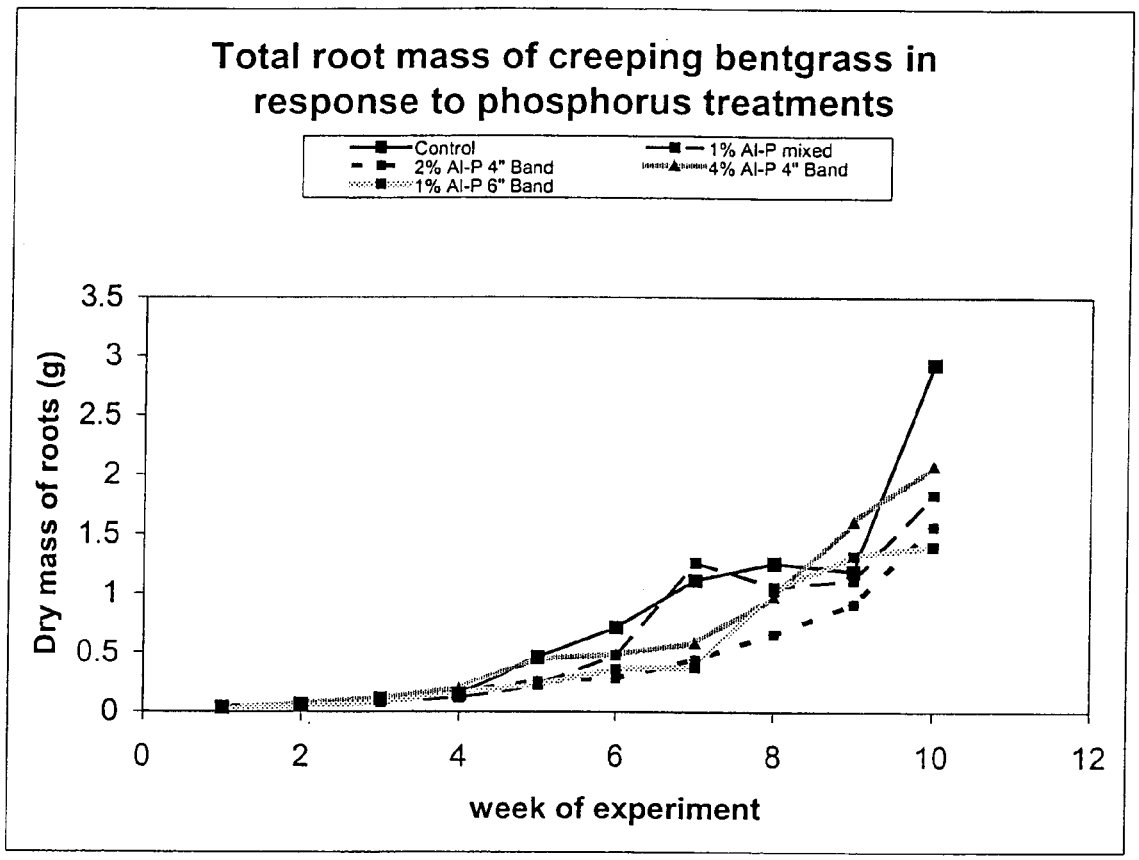
FIG. 3 is a graph of the total root mass of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.
Figure 4:
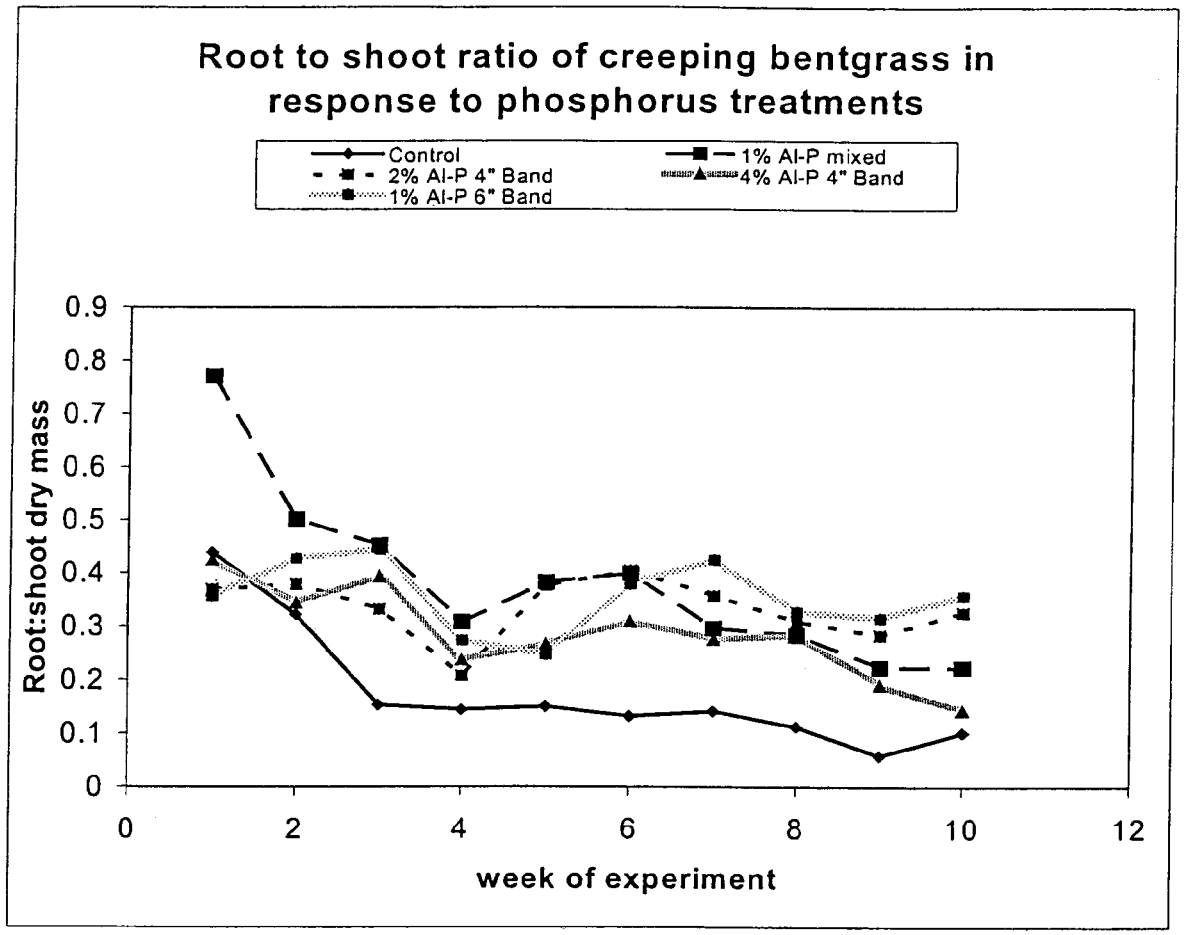
FIG. 4 is a graph of the root to shoot mass of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.
Figure 5:
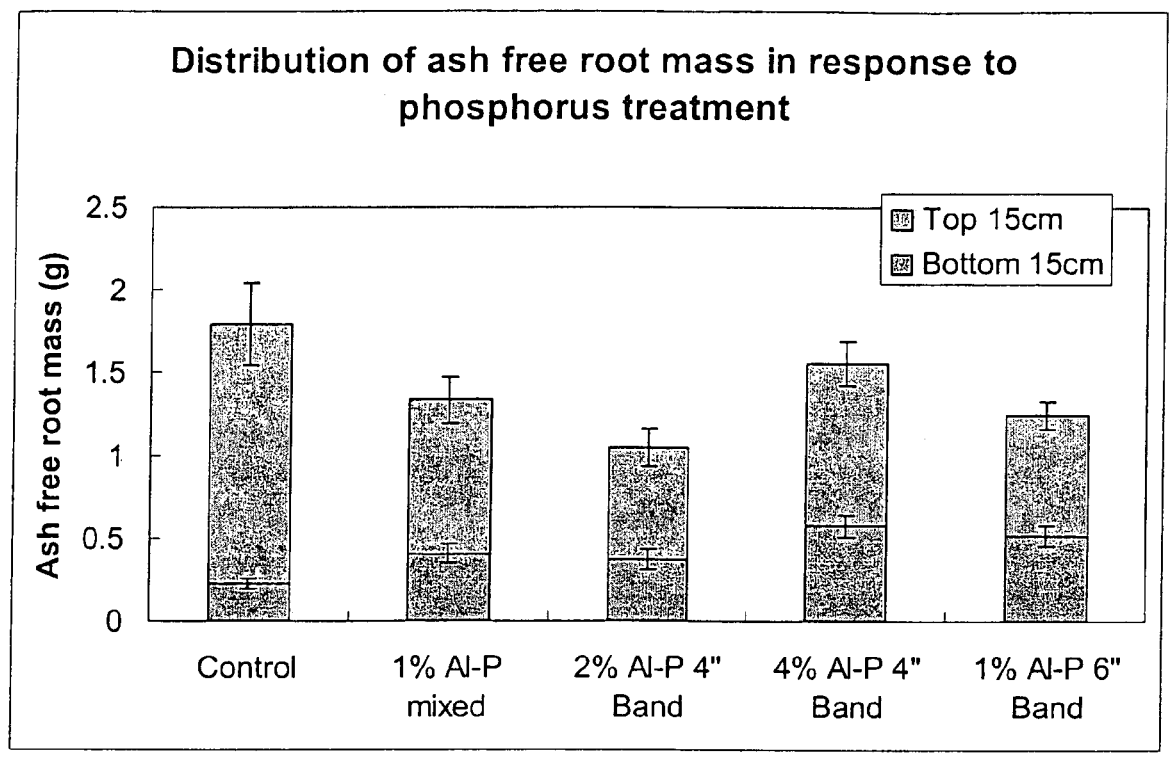
FIG. 5 is a graph of the root mass above and below 15 cm of depth in the last three weeks of a ten-week growth experiment. The control treatment is a complete liquid nutrient solution. In the other treatments a complete nutrient solution without phosphorus is supplemented with an alumina-bound phosphorus source (Al—P), either mixed throughout or banded in the bottom 6 or 4 inches at a percent weight by volume.
Figure 6:
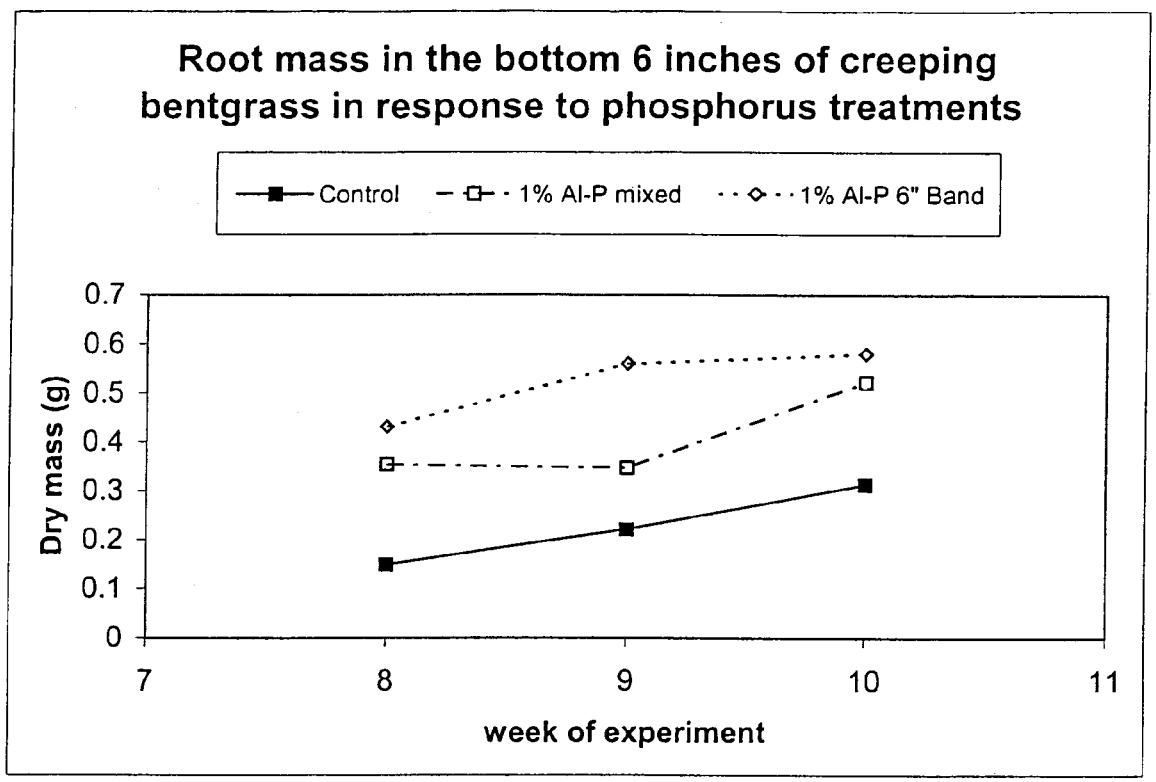
FIG. 6 is a graph of the root mass in the lower 6 inches of the root zone in the final three weeks of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 or 4 inches at a percent weight by volume.
Figure 7:
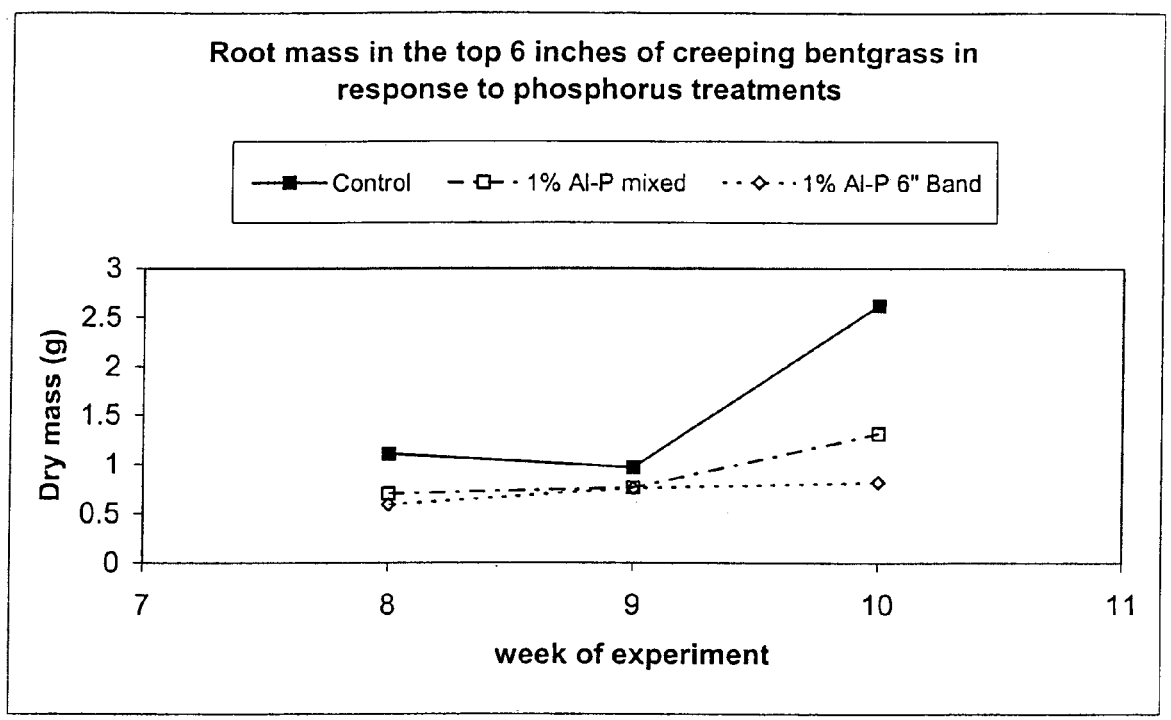
FIG. 7 is a graph of the root mass in the top 6 inches of root zone in the final three weeks of creeping bentgrass over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.
Figure 8:
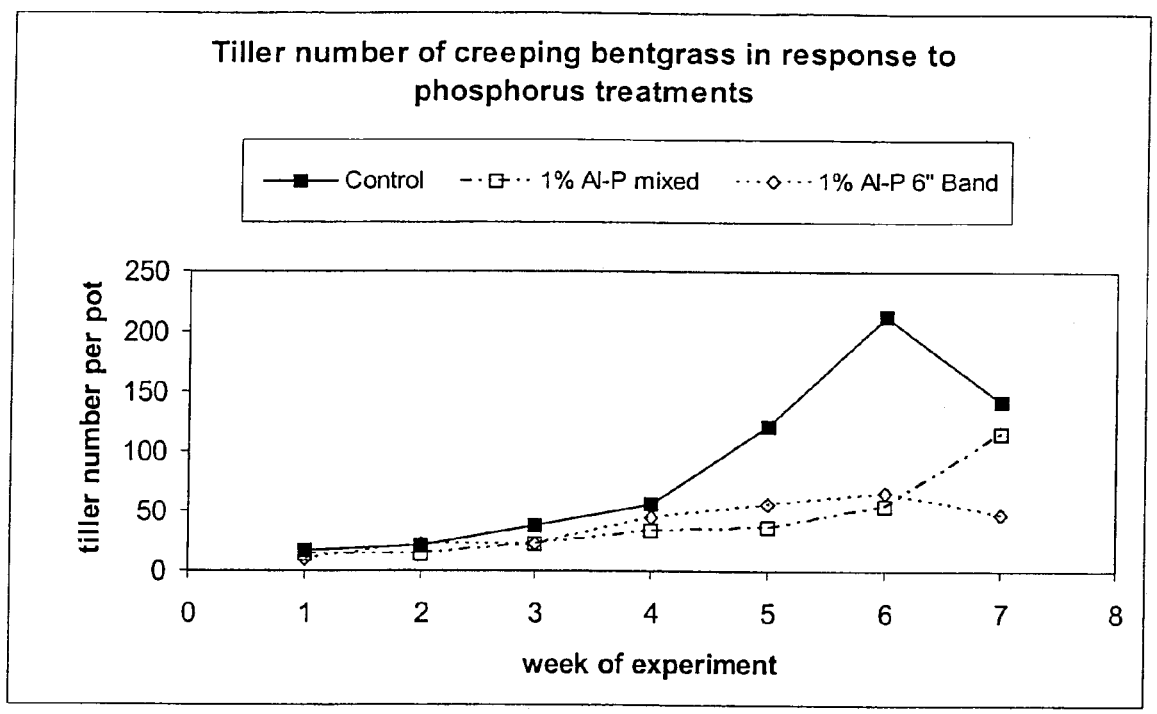
FIG. 8 is a graph of the tiller number of creeping bentgrass for the first seven weeks over a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 inches at a percent weight by volume.
Figure 9:
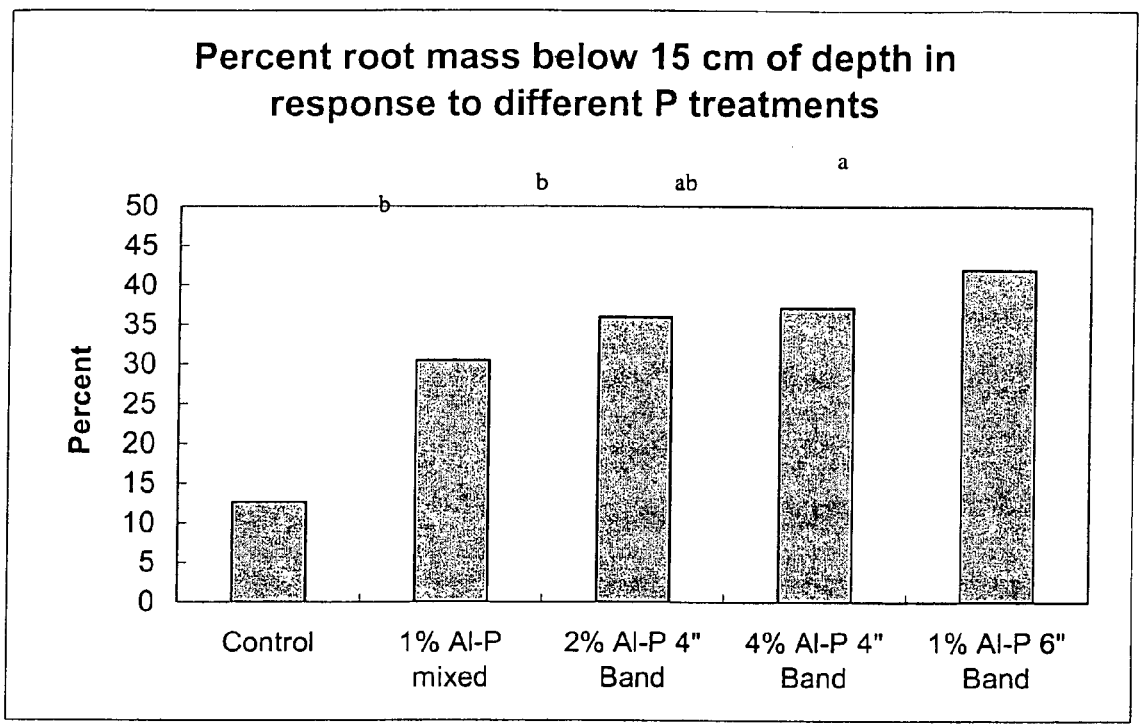
FIG. 9 is the percent root mass below 15 cm of depth for the last 3 weeks of a ten-week growth experiment using different phosphorus fertilization. The control treatment is a complete liquid nutrient solution. In the other treatments a complete nutrient solution without phosphorus is supplemented with an alumina-bound phosphorus source (Al—P), either mixed throughout or banded in the bottom 6 or 4 inches at a percent weight by volume. Different letters represent significant differences at $P<0.05$.

Al—P substantially reduced shoot P concentrations in turfgrass compared with controls (FIG. 1), resulting in reduced shoot growth (FIG. 2), but maintained root growth (FIG. 3), and thus, a substantially increased ratio of root to shoot tissue (FIG. 4). Alumina P treatment, especially when banded at depth, substantially altered root biomass allocation from shallow to deep soil (FIG. 5).

EXAMPLE 2

Figure 10:
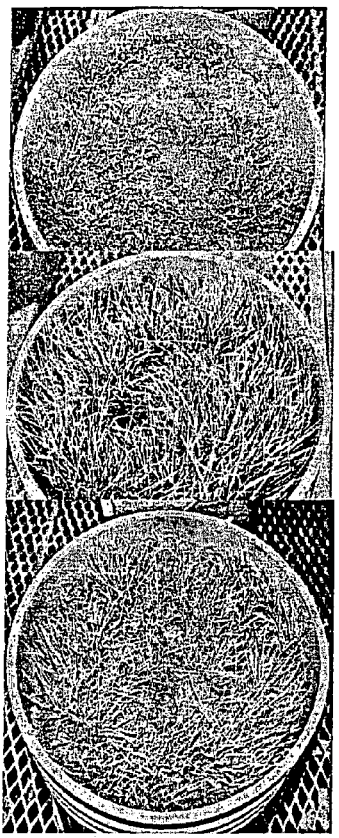
FIG. 10 is photographs of the establishment of two turfgrass species as affected by source of P nutrition.
Figure 10:
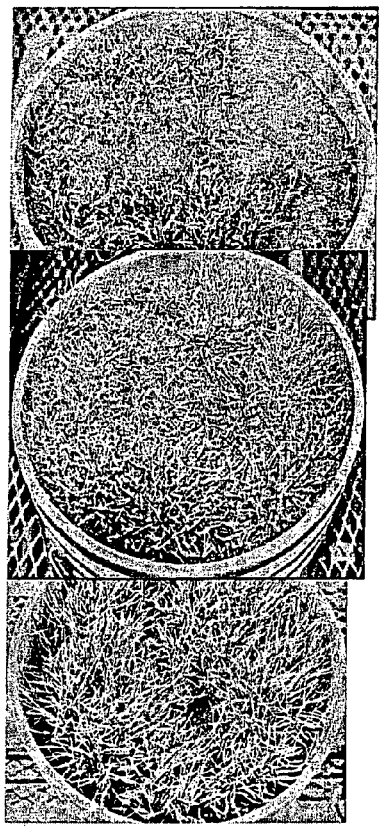
Figure 11:
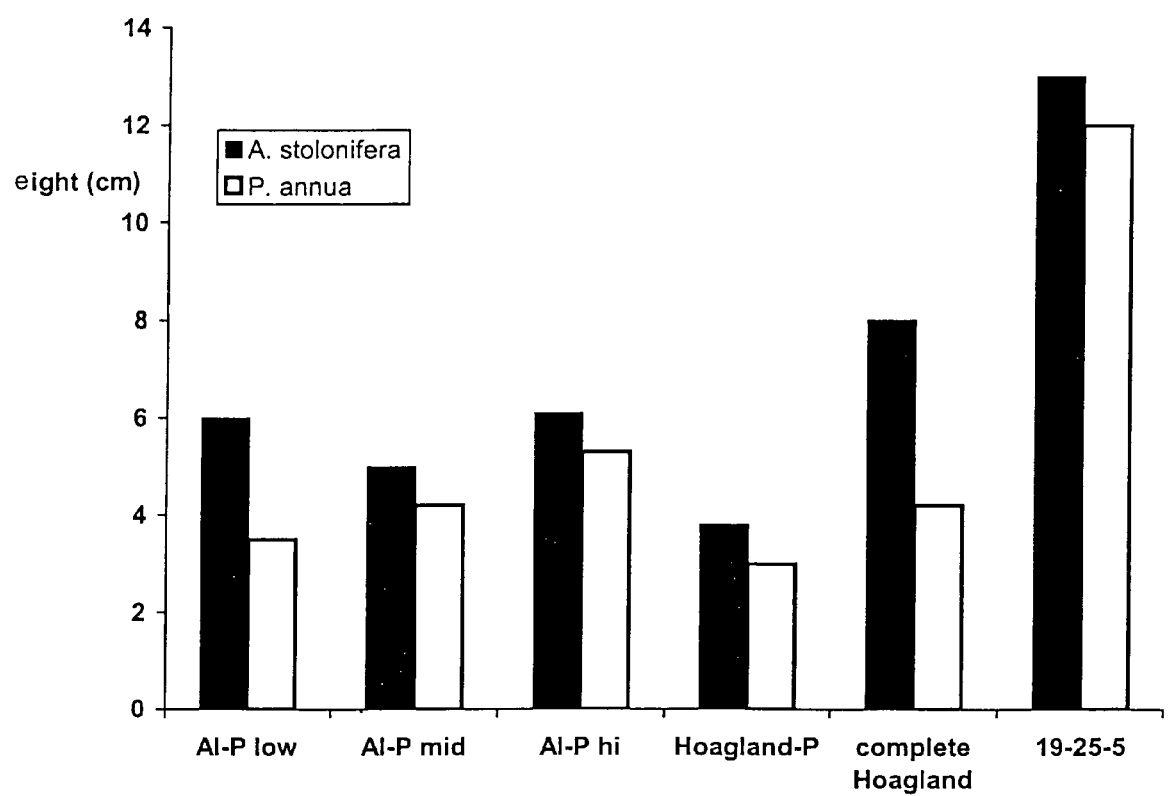
FIG. 11 is a bar graph comparing the height of verdure of *A. stolonifera* and *P. annua* as affected by P source.
Figure 12:
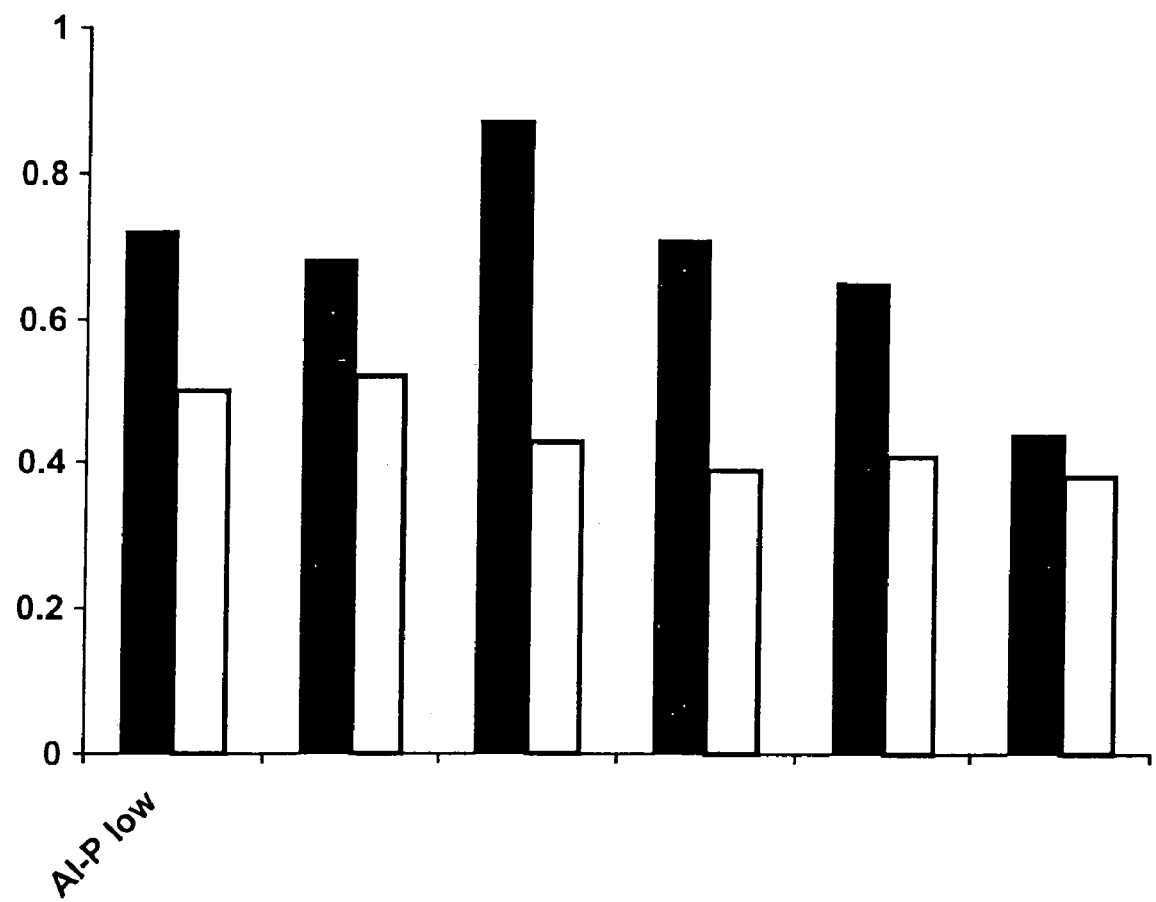
FIG. 12 is the root to shoot ratio of two turfgrass species as affected by P source.
Figure 13:
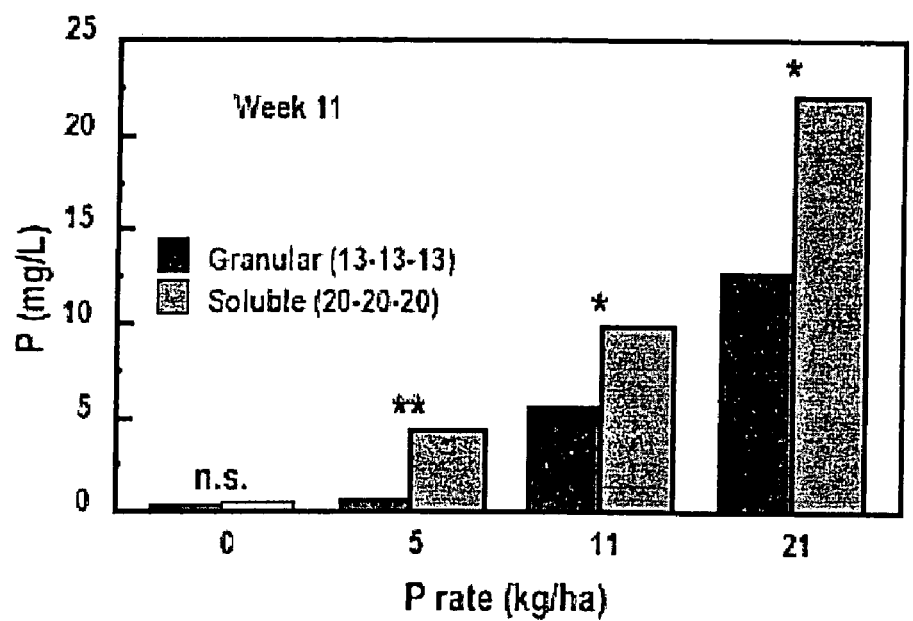
FIG. 13 is a bar graph showing the phosphorus leaching through soil columns planted with turfgrass as influenced by a method of phosphorus application. Leachate collected 4 weeks after planting. Al—P treatments desorbed at 50, 90, or 225 micromolar phosphate. All Al—P treatments included 15-0-15 basal fertilization.
Figure 14:
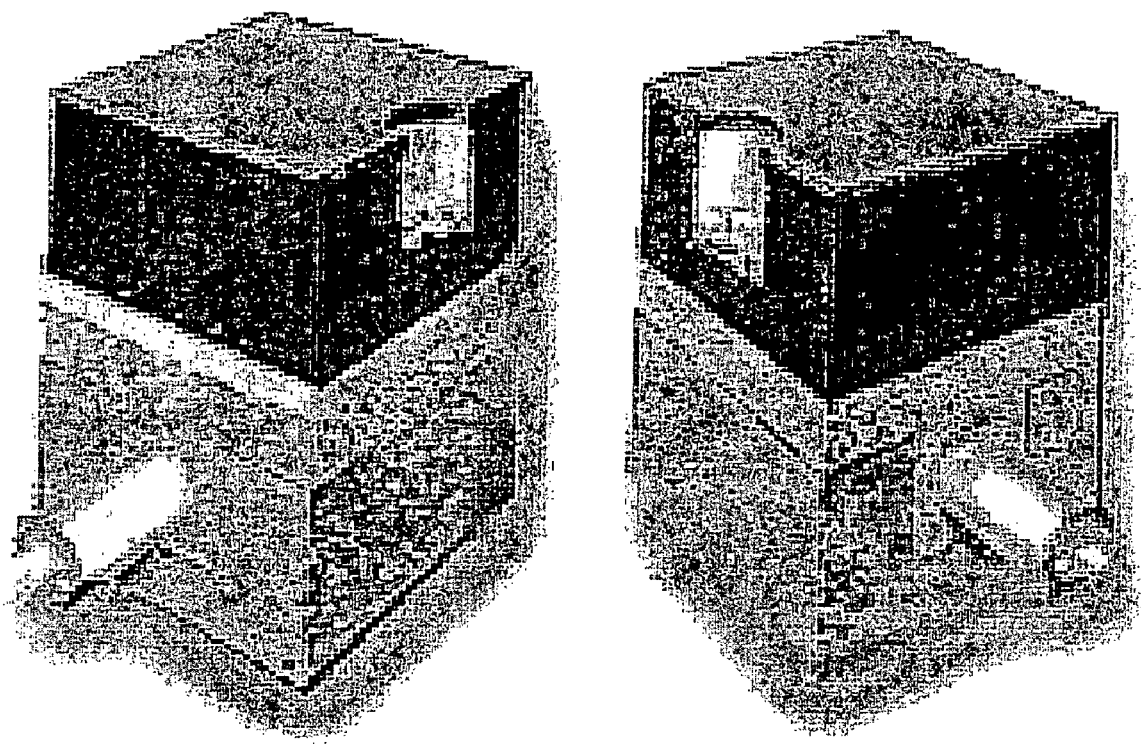
FIG. 14 is a photograph showing a golf green root zone.
Figure 15:
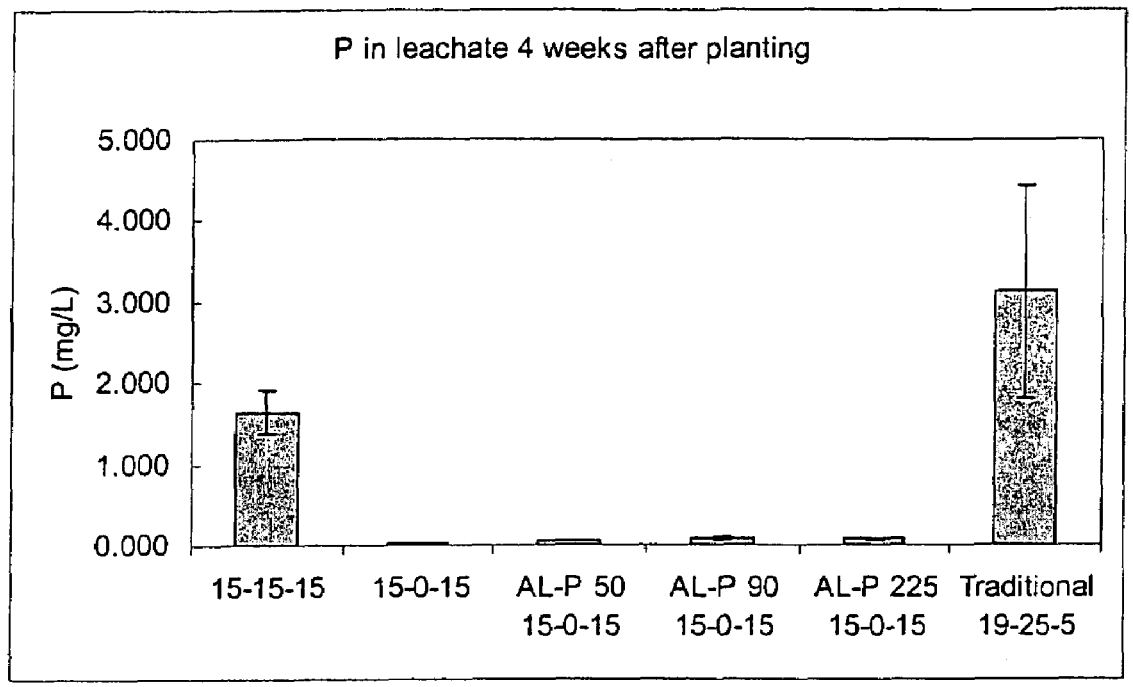
FIG. 15 is a bar graph showing P in leachate 4 weeks after planting.
Figure 16:
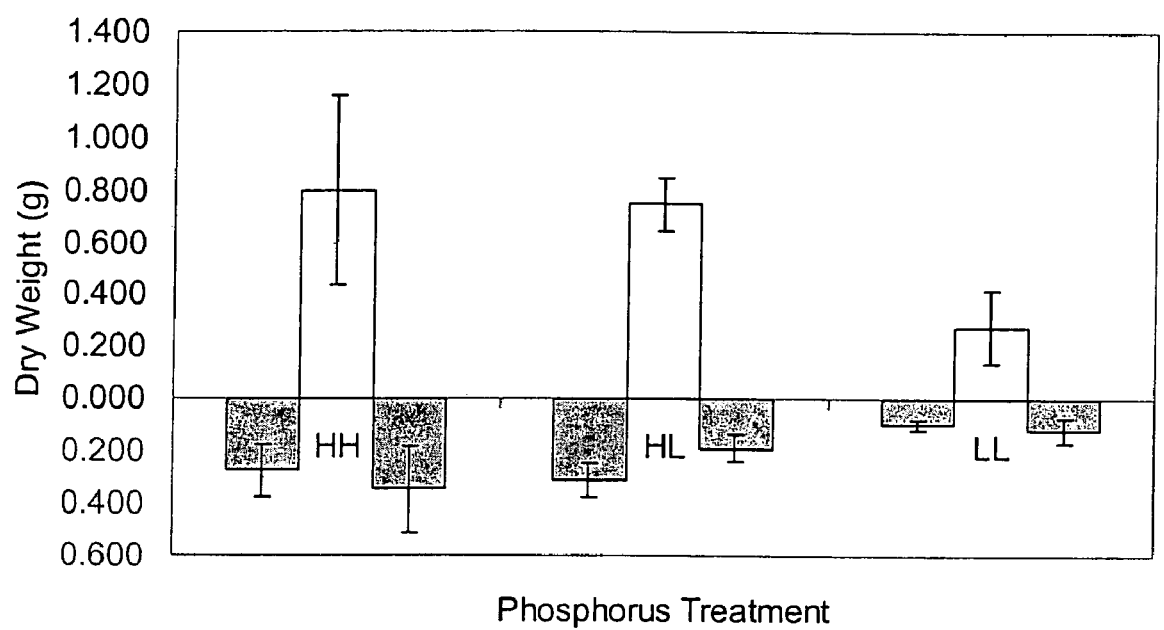
FIG. 16 is a bar graph showing creeping bentgrass root and shoot mass in response to spatial phosphorus supply. HH received phosphorus on both sides of the root zone. LL received no phosphorus. HL received phosphorus on one side of the root zone and no phosphorus on the other.
Figure 17:
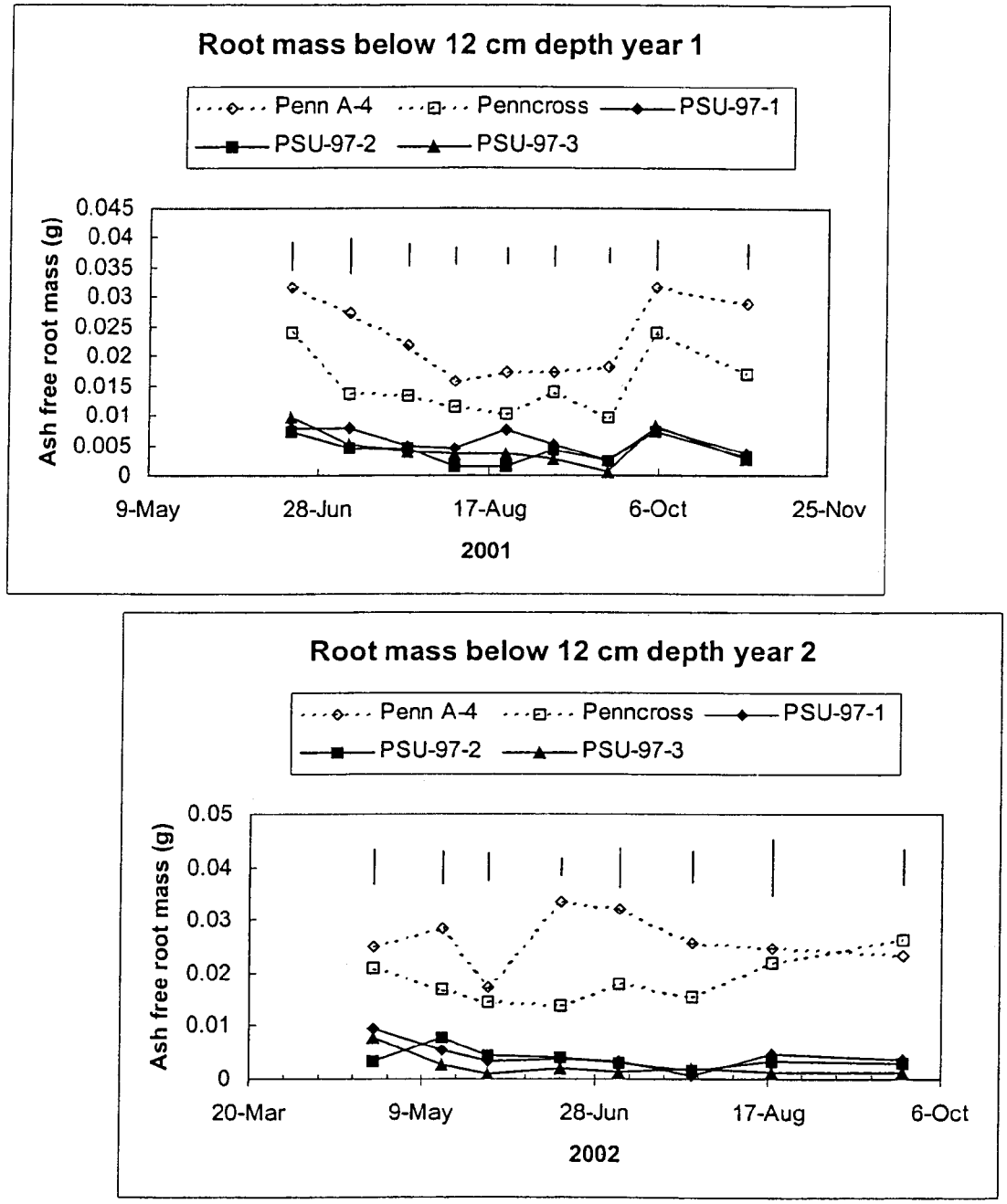
FIG. 17 provides two graphs showing root mass below 12 cm (5 inches) of depth.

Effect of Aluminum Phosphate on Phosphorus Dynamics in Turf at Three Rates of Phosphorus Desorption In this example, similar conditions were used as described above for Example 1, with the exception that the solid-phase buffer was applied at three rates of P desorption, and in all cases was mixed uniformly throughout the root zone. Three rates of Al—P desorption were compared with a nutrient solution lacking P, a complete nutrient solution, and a conventional industry treatment of granular compound fertilizer. Two turfgrass species were compared, the desirable *Agrostis stolonifera* versus the undesirable *Poa annua*. Turf was regularly clipped to simulate mowing. As shown in FIG. 10, establishment of the two species was strongly affected by P source. The Al—P favored growth and establishment of *A. stolonifera* over *P. annua*. Compared with conventional fertilization, Al—P, especially at the low rate of P desorption, caused a proportional reduction in growth of *P. annua* compared with *A. stolonifera* (FIG. 11). This was partly due to the stimulation of root growth in *A. stolonifera* as a result of the solid-phase buffer supply compared with conventional fertilization (FIG. 12). Use of the solid-phase buffer substantially reduced P leaching through the soil columns compared with conventional fertilizer (FIG. 13).

While the invention has been particularly shown and described with reference to preferred embodiments thereof, it will be understood by those skilled in the art that various alterations in form and detail may be made therein without departing form the sprit and scope of the invention. Thus, the present invention is not limited to the embodiments described and exemplified herein, but is capable of variation and modification within the scope of the appended claims.

The invention claimed is:

1. A phosphorus solid-phase buffer system for plant fertilization, comprising:
    a phosphorus solid-phase buffer comprising a metal substrate that is exposed to an aqueous solution containing phosphorus for a time sufficient to adsorb the phosphorus onto the metal substrate via an exchange equilibrium that is created between the aqueous solution and the phosphorus, and
    a media,
    wherein said phosphorus solid-phase buffer is banded in the media according to the needs of the plant, and further wherein the phosphorus adsorbed onto the phosphorus solid-phase buffer is desorbed from the buffer and released into the media in a sustained fashion, thereby providing a consistent supply of phosphorus to the plant.

2. The phosphorus solid-phase buffer system of claim 1, wherein the metal substrate is aluminum.

3. The phosphorus solid-phase buffer system of claim 2, wherein the aluminum is selected from the group consisting of aluminum oxide pellets, aluminum hydroxide, clays, aluminum oxide rich soils and bauxite.

4. The phosphorus solid-phase buffer system of claim 1, wherein the phosphorus solid-phase buffer is banded at a specific depth of a rooting volume of a plant.

5. The phosphorus solid-phase buffer system of claim 1, wherein the phosphorus solid-phase buffer is banded on top of existing plant media.

6. The phosphorus solid-phase buffer system of claim 1, wherein the phosphorus solid-phase buffer is banded on top of existing plant media as well as at a specific depth of a rooting volume of a plant.

7. The phosphorus solid-phase buffer system of claim 1, wherein the amount of phosphorus solid-phase buffer is between about 0.1 to 20% weight/volume of a rooting volume.

8. The phosphorus solid-phase buffer system of claim 1, wherein the amount of phosphorus solid-phase buffer is between about 0.2 to 10% weight/volume of a rooting volume.

9. The phosphorus solid-phase buffer system of claim 1, wherein the amount of phosphorus solid-phase buffer is between about 1 to 2% weight/volume of a rooting volume.

10. The phosphorus solid-phase buffer system of claim 1, wherein the media is selected from the group consisting of earthen soils, earthen soils containing additives, earthen-growing media, non-soil elements and artificial substrates, said artificial substrates selected from the group consisting of peat, perlite, vermiculite, rockwool, coconut fiber, sand and all combinations or mixtures thereof.

11. The phosphorus solid-phase buffer system of claim 1, wherein the plants are selected from the group consisting of containerized plants and field-grown plants, said field-grown plants selected from the group consisting of crops, grasses and trees.

12. A method of fertilizing a plant with phosphorus, comprising applying a phosphorus solid-phase buffer to media in which the plants are grown via banding the phosphorus solid-phase buffer in the media according to the needs of the plant, wherein the solid-phase buffer is applied before, concurrently with, or after a phosphorus fertilizer is applied to the media.

13. The method of claim 12, wherein the phosphorus solid-phase buffer is a metal substrate that is exposed to an aqueous solution containing phosphorus for a time sufficient to adsorb the phosphorus onto the metal substrate via an exchange equilibrium that is created between the aqueous solution and the phosphorus, and further wherein the phosphorus adsorbed onto the solid-phase buffer is desorbed from the buffer and released into the media in a sustained fashion, thereby providing a consistent supply of phosphorus to the plant.

14. The method of claim 13, wherein the metal substrate is aluminum.

15. The method of claim 14, wherein the aluminum is selected from the group consisting of aluminum oxide pellets, aluminum hydroxide, clays, aluminum oxide rich soils and bauxite.

16. The method of claim 12, wherein the phosphorus solid-phase buffer is banded at a specific depth of a rooting volume of a plant.

17. The method of claim 12, wherein the phosphorus solid-phase buffer is banded on top of existing plant media.

18. The method of claim 12, wherein the phosphorus solid-phase buffer is banded on top of existing plant media as well as at a specific depth of a rooting volume of a plant.

19. The method of claim 12, wherein the amount of phosphorus solid-phase buffer is between about 0.1 to 20% weight/volume of a rooting volume.

20. The method of claim 12, wherein the amount of phosphorus solid-phase buffer is between about 0.2 to 10% weight/volume of a rooting volume.

21. The method of claim 12, wherein the amount of phosphorus solid-phase buffer is between about 1 to 2% weight/volume of a rooting volume.

22. The method of claim 12, wherein the media is selected from the group consisting of earthen soils, earthen soils containing additives, earthen-growing media, non-soil elements and "artificial" substrates, said artificial substrates selected from the group consisting of peat, perlite, vermiculite, rockwool, coconut fiber, sand and all combinations or mixtures thereof.

23. The method of claim 12, wherein the plants are selected from the group consisting of containerized plants and field-grown plants, said field-grown plants selected from the group consisting of crops, grasses and trees.

24. The method of claim 12, wherein the phosphorus solid-phase buffer is applied to unplanted media.

25. The method of claim 12, wherein the phosphorus solid-phase buffer is applied to constructed media.

26. The method of claim 12, wherein the phosphorus solid-phase buffer is applied to media in which plants are growing.

27. The method of claim 12, wherein the media comprises more than 50 ppm of phosphorus prior to the application of the phosphorus solid-phase buffer.

28. The method of claim 12, wherein the media comprises between about 30 to 50 ppm of phosphorus prior to the application of the phosphorus solid-phase buffer.

29. The method of claim 12, wherein the media comprises between about 0 to 30 ppm of phosphorus prior to the application of the phosphorus solid-phase buffer.

30. The method of claim 12, further comprising recharging the phosphorus solid-phase buffer in situ with phosphorus to restore a desired phosphorus concentration to the solid-phase buffer.

31. A method of reducing/eliminating the presence of invasive species in plant growth media, comprising applying a phosphorus solid-phase buffer to media in which the plants are grown via banding the phosphorus solid-phase buffer in the media according to the needs of the plant, wherein the phosphorus solid-phase buffer is a metal substrate that is exposed to an aqueous solution containing phosphorus for a time sufficient to adsorb the phosphorus onto the metal substrate via an exchange equilibrium that is created between the aqueous solution and the phosphorus, and further wherein the phosphorus adsorbed onto the solid-phase buffer is desorbed from the buffer and released into the media at a controlled rate that hinders or prevents the growth of said invasive species.

32. The method of claim 31, wherein the metal substrate is aluminum.

33. The method of claim 32, wherein the aluminum is selected from the group consisting of aluminum oxide pellets, aluminum hydroxide, clays, aluminum oxide rich soils and crude bauxite.

34. The method of claim 31, wherein the phosphorus solid-phase buffer is banded at a specific depth of a rooting volume of a plant.

35. The method of claim 31, wherein the phosphorus solid-phase buffer is banded on top of existing plant media.

36. The method of claim 31, wherein the phosphorus solid-phase buffer is banded on top of existing plant media as well as at a specific depth of a rooting volume of a plant.

37. The method of claim 31, wherein the amount of phosphorus solid-phase buffer is between about 0.1 to 20% weight/volume of a rooting volume.

38. The method of claim 31, wherein the amount of phosphorus solid-phase buffer is between about 0.2 to 10% weight/volume of a rooting volume.

39. The method of claim 31, wherein the amount of phosphorus solid-phase buffer is between about 1 to 2% weight/volume of a rooting volume.

40. The method of claim 31, wherein the media is selected from the group consisting of earthen soils, earthen soils containing additives, earthen-growing media, non-soil elements and artificial substrates, said artificial substrates selected from the group consisting of peat, perlite, vermiculite, rockwool, coconut fiber, sand and all combinations or mixtures thereof.

41. The method of claim 31, wherein phosphorus solid-phase buffer is applied to unplanted media.

42. The method of claim 31, wherein the plants are selected from the group consisting of containerized plants and field-grown plants, said field grown plants selected from the group consisting of crops, grasses and trees.

43. The method of claim 31, wherein the phosphorus solid-phase buffer is applied to constructed media.

44. The method of claim 31, wherein the phosphorus solid-phase buffer is applied to media in which plants are growing.

45. The method of claim 31, wherein the media comprises more than 50 ppm of phosphorus prior to the application of the phosphorus solid-phase buffer.

46. The method of claim 31, wherein the media comprises between about 30 to 50 ppm of phosphorus prior to the application of the phosphorus solid-phase buffer.

47. The method of claim 31, wherein the media comprises between about 0 to 30 ppm of phosphorus prior to the application of the phosphorus solid-phase buffer.

48. The method of claim 31, further comprising recharging the phosphorus solid-phase buffer in situ with phosphorus to restore a desired phosphorus concentration to the solid-phase buffer.

* * * * *

UNITED STATES PATENT AND TRADEMARK OFFICE
CERTIFICATE OF CORRECTION

| | |
|---|---|
| PATENT NO. | : 7,485,171 B2 |
| APPLICATION NO. | : 10/903210 |
| DATED | : February 3, 2009 |
| INVENTOR(S) | : Lynch et al. |

It is certified that error appears in the above-identified patent and that said Letters Patent is hereby corrected as shown below:

<u>On the Title Page</u>, See Item (75) Inventors: after the first inventor, "State Collete, PA 16083" should read -- State College, PA 16803 --

The following paragraph should be inserted on the Title Pg., and at Column 1, immediately before "BACKGROUND OF THE INVENTION":

-- STATEMENT REGARDING FEDERALLY SPONSORED RESEARCH
This invention was made with government support under Hatch Act Project No. PEN03746, awarded by the United States Department of Agriculture (USDA). The Government has certain rights in the invention. --

Signed and Sealed this

Twelfth Day of May, 2009

JOHN DOLL
*Acting Director of the United States Patent and Trademark Office*